(12) United States Patent
Tesch et al.

(10) Patent No.: US 7,856,432 B2
(45) Date of Patent: Dec. 21, 2010

(54) SYSTEMS AND METHODS FOR SEARCHING AND DISPLAYING SEARCH HITS IN HIERARCHIES

(75) Inventors: Guido Tesch, Karlsruhe (DE); Udo Arend, Heidelberg (DE); Edmund Eberleh, St. Leon-Rot (DE)

(73) Assignee: SAP AG, Walldorf (DE)

( * ) Notice: Subject to any disclaimer, the term of this patent is extended or adjusted under 35 U.S.C. 154(b) by 317 days.

(21) Appl. No.: 10/972,338

(22) Filed: Oct. 26, 2004

(65) Prior Publication Data

US 2005/0120005 A1 Jun. 2, 2005

Related U.S. Application Data

(60) Provisional application No. 60/514,473, filed on Oct. 27, 2003.

(51) Int. Cl.
*G06F 17/30* (2006.01)

(52) U.S. Cl. ...................... 707/722; 707/758

(58) Field of Classification Search .............. 707/722, 707/758
See application file for complete search history.

(56) References Cited

U.S. PATENT DOCUMENTS

| | | | | |
|---|---|---|---|---|
| 5,875,446 A | * | 2/1999 | Brown et al. ................. 707/3 |
| 5,995,979 A | * | 11/1999 | Cochran ................... 707/104.1 |
| 6,012,055 A | * | 1/2000 | Campbell et al. .............. 707/5 |
| 6,611,840 B1 | * | 8/2003 | Baer et al. .................. 707/102 |
| 2001/0034734 A1 | * | 10/2001 | Whitley et al. ........... 707/104.1 |
| 2001/0044758 A1 | * | 11/2001 | Talib et al. ................... 705/27 |
| 2001/0049677 A1 | * | 12/2001 | Talib et al. .................... 707/3 |
| 2002/0095427 A1 | * | 7/2002 | Kaplan ...................... 707/102 |
| 2002/0152222 A1 | * | 10/2002 | Holbrook ................. 707/104.1 |
| 2002/0191212 A1 | * | 12/2002 | Simpson et al. ............ 358/1.15 |
| 2002/0198885 A1 | * | 12/2002 | Streepy, Jr. ................. 707/100 |
| 2003/0004941 A1 | * | 1/2003 | Yamada et al. ................. 707/3 |
| 2003/0120657 A1 | * | 6/2003 | French et al. ................. 707/10 |
| 2003/0214538 A1 | * | 11/2003 | Farrington et al. .......... 345/854 |
| 2004/0036716 A1 | * | 2/2004 | Jordahl ...................... 345/713 |
| 2004/0083273 A1 | * | 4/2004 | Madison et al. ............. 709/217 |

* cited by examiner

*Primary Examiner*—Neveen Abel Jalil
*Assistant Examiner*—Son T Hoang
(74) *Attorney, Agent, or Firm*—Finnegan, Henderson, Farabow, Garrett & Dunner, LLP (57) ABSTRACT

A method or system may search and display search hits as a hierarchy of objects in a computed-based environment. For example, the method may include performing a search on the objects based on search criteria entered by the user, and identifying search hits based on the search performed on the objects, each search hit corresponding to an object matching the search criteria. Further, the method may include providing a display including a hierarchy of objects and indicating the search hits identified from the search to the user, and providing a set of control buttons to permit the user to navigate the display and view the search hits.

23 Claims, 6 Drawing Sheets

| Profit Center Hierarchy for CO Area 1000 | Search |
|---|---|

Search Criteria:
| Object Type | Any ▼ |
| Object ID | |
| Description | |
| Status | |

[Go]

Search criteria may be entered by user to perform search on hierarchy of objects Exemplary display with the search tab selected

| Show in Hierarchy | | Show Master Data | Show Plan Data |

0 Selected | 0 Objects found    Page 1 of 1

| | Object ID | ⇕ | Description | ⇕ | Status | ⇕ |
|---|---|---|---|---|---|---|

This table does not contain any entries.

FIG. 3

Exemplary display with the hierarchy tab selected

| Profit Center Hierarchy for CO Area 1000 / Search |
|---|
| [Load] | [Show Path Only] [Show Overview] [Show Master Data] [Show Plan Data] |
| 23 Selected | [Show Search Hits] |

| ☐ | Profit Center Hierarchy |
|---|---|
| ☐ | ▼ O 🖧 H1 Standard Hierarchy CA1000 |
| ☐ | ▼ O 🖧 HE Europe |
| ☐ | ▶ O 🖧 H1000 Stock Products |
| ☐ | ▶ O 🖧 H1100 External Services |
| ☐ | ▶ ☐ 🖧 H1300 External Services |
| ☐ | ▼ O 🖧 H1400 Admin & Internal Services |
| ☐ | ▼ O 🖧 H1410 Internal Services |
| ☑ | ▼ O 🗐 1410 Internal Services |
| ☐ | ▶ O 🗐 4110 Technical Facilities |
| ☐ | ▶ O 🗐 4120 IT Services |
| ☐ | ▶ O 🗐 4130 Warehouse |
| ☐ | ▶ O 🗐 4300 Plant Maintenance |
| ☐ | ▶ O 🗐 4400 Quality Assurance |
| ☐ | ▼ O 🗐 4400 Research & Development |
| ☐ | • ◇ 10000 Ongoing Development |

Profit Center Hierarchy for CO Area 1000 / Search

Search Criteria:
| Object Type | Any ▼
| Object ID | 4*
| Description | *
| Status | *

[Go]

[Show in Hierarchy] | [Show Master Data] [Show Plan Data]

0 Selected | 7 Objects found    △▽ Page 1 of 2

| | Object ID ⇕ | Description ⇕ | Status ⇕ |
|---|---|---|---|
| ☐ | 4110 | Technical Facilities | ● |
| ☐ | 4120 | IT Services | ● |
| ☐ | 4130 | Warehouse | ● |
| ☐ | 4300 | Plant Maintenance | ● |
| ☐ | 4400 | Quality Assurance | ● |

Control button for user - provides option to view search hits in hierarchy

List of search hits displayed to user

FIG. 6

SYSTEMS AND METHODS FOR SEARCHING AND DISPLAYING SEARCH HITS IN HIERARCHIES

CROSS-REFERENCE TO RELATED APPLICATION(S)

This application claims the benefit of priority from U.S. Provisional Application No. 60/514,473, filed on Oct. 27, 2003, the disclosure of which is expressly incorporated herein by reference to its entirety.

BACKGROUND

1. Technical Field

The present invention generally relates to computer-implemented displays of items, including items displayed in hierarchies. More particularly, embodiments of the invention relate to systems and methods for searching and displaying search hits in hierarchies.

2. Background Information

Presently, there is a need to search items or objects arranged and displayed in hierarchies. The items or objects may correspond to data (e.g., tables, etc.), files (e.g., word processing documents, spreadsheet files, etc.) or folders (e.g., representing a collection or group of data or files) stored in memory or a database. These items or objects may be organized in hierarchies and represented on a computer screen or other suitable display by any combination of characters, icons and/or graphics. The need to search these items arises when, for example, a user is interested in locating or analyzing stored data, files or folders. This is relevant not only for personal computers, but also other types of computer-based environments such as workstations, servers, laptops, personal digital assistants (PDAs), mobile phones, handheld devices, and other computing devices.

A common problem is how to search objects or folders within a hierarchy and display the search hits or results. Another problem in the art is how to allow a user to browse search hits related to hierarchies. Current solutions do not sufficiently address these problems. For example, displaying a flat list of search hits (a common approach in popular PC operating systems such as Microsoft Windows) omits important information indicating a search hit's location in the hierarchy. In particular, this approach omits context information related to where a search hit is located in the hierarchy. Showing the path from the root of the hierarchy to the search hit gives partial information about this, but this is often not sufficient or not usable. Further, even if the search hits were displayed in the hierarchy, other problems remain, such as how to move from one hit to the next, and how to get an overview of all of the search hits. Presently, no solutions exist that address these problems.

SUMMARY

Consistent with embodiments of the present invention, systems and methods are provided for searching and displaying search hits in hierarchies.

In accordance with one embodiment, systems and methods are provided for permitting a user to search a displayed hierarchy of objects. The results of the search (hereinafter the "search hits") are displayed in the hierarchy. Further, the user is allowed to browse and view the search hits in the hierarchy, while getting an overview of all of the search hits.

In accordance with another embodiment, a search form or input screen is provided to permit a user to perform a search for objects. When one or more search hits exist, the search hits are displayed in a hierarchy. To identify the search hits, the search hits may be marked, coded or highlighted in the hierarchy of objects. A special set of controls (e.g., scroll bars, control buttons, etc.) may be provided to permit the user to navigate or browse the search hits in the hierarchy. The set of controls may also give information related to the search hits, such as the number of search hits located. Furthermore, to provide a more user-friendly environment, various display options may be included, such as the ability to switch to a flat list display of the search hits if desired by the user.

Embodiments consistent with the invention may further include a method for searching and displaying search hits as a hierarchy of objects in a computed-based environment. The method may comprise: performing a search on the objects based on search criteria entered by the user; identifying search hits based on the search performed on the objects, each search hit corresponding to an object matching the search criteria; providing a display including a hierarchy of objects and indicating the search hits identified from the search to the user; and providing a set of control buttons to permit the user to navigate the display and view the search hits.

Embodiments consistent with the invention also provide a system for searching and displaying search hits as a hierarchy of objects in a computed-based environment. The system may comprise: means for performing a search on the objects based on search criteria entered by the user; means for identifying search hits based on the search performed on the objects, each search hit corresponding to an object matching the search criteria; means for providing a display including a hierarchy of objects and indicating the search hits identified from the search to the user; and means for providing a set of control buttons to permit the user to navigate the display and view the search hits.

Moreover, embodiments consistent with the invention may provide a computer program product including instructions for execution by a processor for performing a method for searching and displaying search hits as a hierarchy of objects. Such a method may comprise: performing a search on the objects based on search criteria entered by the user; identifying search hits based on the search performed on the objects, each search hit corresponding to an object matching the search criteria; providing a display including a hierarchy of objects and indicating the search hits identified from the search to the user; and providing a set of control buttons to permit the user to navigate the display and view the search hits.

It is to be understood that both the foregoing general description and the following detailed description are exemplary and explanatory only, and should not be considered restrictive of the scope of the invention. Further, features and/or variations may be provided in addition to those set forth herein. For example, embodiments of the invention may be directed to various combinations and sub-combinations of the features described in the detailed description.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present embodiments consistent with the invention, examples of which are illustrated in the accompanying drawings. Wherever possible, the same reference numbers will be used throughout the drawings to refer to the same or like parts.

The following detailed description refers to the accompanying drawings. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention.

Embodiments of the present invention are directed to systems and methods for searching and displaying search hits related to a displayed hierarchy of objects. Embodiments of the invention may be implemented in various environments, including computer-based environments, such as personal computers, workstations, servers, and laptops, as well as personal digital assistants (PDAs), mobile phones, handheld devices, and other computing devices. The items or objects may correspond to data (tables, etc.), files (such as word processing or spreadsheet files) or folders (representing a collection or group of data or files). The items or objects may or may not be stored and organized in hierarchies. The objects may be represented on a computer screen or other suitable display devices as a hierarchy by any combination of characters, icons and/or graphics. The need to search these items may arise when, for example, a user is interested in locating or analyzing stored data, files or folders.

The source of the data that is searched and displayed as a hierarchy is not critical to the invention, nor is the organization of the data while stored critical to the invention. For example, the data comprising the items or objects may be stored in a conventional database, such as a relational database, or some other searchable source of data, such as websites on the Internet.

As will be appreciated by those skilled in the art, embodiments and features of the invention may be implemented through computer-hardware and/or software. Such embodiments may be implemented in various environments, such as personal computing, workstation, networked and other computing-based environments with one or more users. The present invention, however, is not limited to such examples, and embodiments of the invention may be implemented with other platforms and in other environments.

By way of example, embodiments of the invention may be implemented using conventional personal computers (PCs), desktops, hand-held devices, multiprocessor computers, pen computers, microprocessor-based or programmable consumer electronics devices, minicomputers, mainframe computers, personal mobile computing devices, mobile phones, portable or stationary personal computers, palmtop computers or the like.

The storage mediums and databases referred to herein symbolize elements that temporarily or permanently store data and instructions. Although storage functions may be provided as part of a computer, memory functions can also be implemented in a network, processors (e.g., cache, register), or elsewhere. While examples of databases have been provided herein, various types of storage mediums can be used to implemented features of the invention, such as a read only memory (ROM), a random access memory (RAM), or a memory with other access options. Further, memory functions may be physically implemented by computer-readable media, such as, for example: (a) magnetic media, like a hard disk, a floppy disk, a magnetic disk, a tape, or a cassette tape; (b) optical media, like an optical disk (e.g., a CD-ROM), or a digital versatile disk (DVD); (c) semiconductor media, like DRAM, SRAM, EPROM, EEPROM, memory stick, and/or by any other media, like paper.

Embodiments of the invention may also be embodied in computer program products that are stored in a computer-readable medium or transmitted using a carrier, such as an electronic carrier signal communicated across a network between computers or other devices. In addition to transmitting carrier signals, network environments may be provided to link or connect components in the disclosed systems. Networking environments are commonplace in offices, enterprise-wide computer networks, intranets and the Internet (i.e., the World Wide Web). The network can be a wired or a wireless network. To name a few network implementations, the network is, for example, a local area network (LAN), a wide area network (WAN), a public switched telephone network (PSTN), an Integrated Services Digital Network (ISDN), an infra-red (IR) link, a radio link, such as a Universal Mobile Telecommunications System (UMTS), Global System for Mobile Communication (GSM), Code Division Multiple Access (CDMA), or a satellite link.

Transmission protocols and data formats are also known, for example, as transmission control protocol/internet protocol (TCP/IP), hyper text transfer protocol (HTTP), secure HTTP, wireless application protocol, unique resource locator (URL), unique resource identifier (URI), hyper text markup language (HTML), extensible markup language (XML), extensible hyper text markup language (XHTML), wireless application markup language (WML), Standard Generalized Markup Language (SGML), etc. Such features may be utilized to implement embodiments of the present invention, as disclosed herein.

Figure 1:
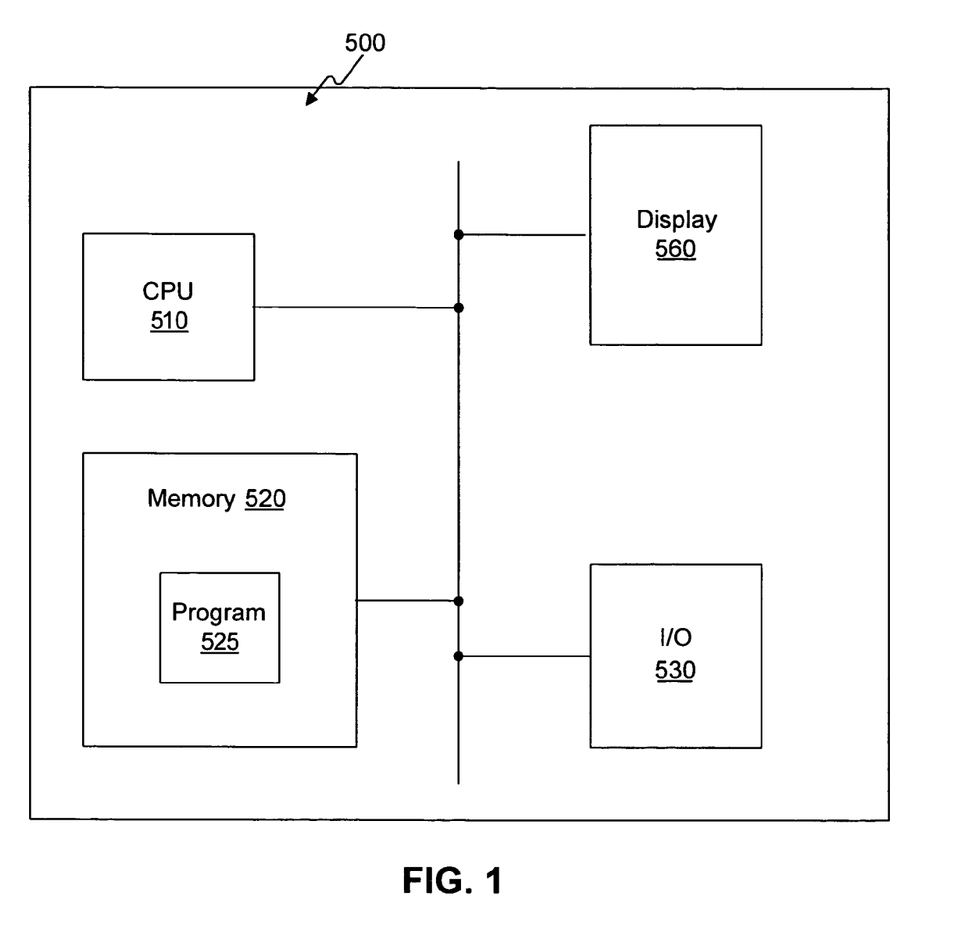
FIG. 1 illustrates an exemplary computing-based environment for implementing embodiments of the invention.

By way of example, FIG. 1 illustrates an exemplary computing-based environment 500 that can be used to implement embodiments of the invention. The components and arrangement, however, are not critical to the present invention.

Computing environment 500 includes a number of components, such as a central processing unit (CPU) 510, a memory 520, an input/output (I/O) device(s) 530, and a display 560 that can be implemented in various ways. For example, an integrated platform (such as a workstation, personal computer, laptop, etc.) may be utilized and comprise CPU 510, memory 520, I/O device(s) 530 and display 560. In such a configuration, components 510, 520, 530 and 560 may connect through a local bus interface, direct communication links and/or other suitable connections.

CPU 510 may be one or more known processing devices, such as a microprocessor from the Pentium family manufactured by Intel™. Memory 520 may be one or more storage devices configured to store information used by CPU 510 to perform certain functions related to embodiments of the present invention. Memory 520 may be a magnetic, semiconductor, tape, optical, or other type of storage device. In one embodiment, memory 520 includes one or more programs that, when executed by CPU 510, perform methods consistent with the present invention. For example, memory 520 may include a program 525 that, when executed by CPU 510, permits a user to search and display search hits in a hierarchy on display 560. Memory 520 may also include other programs that perform other functions consistent with embodiments of the invention.

Methods, systems, and articles of manufacture consistent with the present invention are not limited to programs configured to perform dedicated tasks. For example, memory 520 may be configured with a program that performs several functions when executed by CPU 510. That is, memory 520 may include a program 525 for searching objects or items stored in memory 520 or an external database (not shown). Program 525 or another program stored in memory 520 may display the search hits within a hierarchy displayed on display 560. Alternatively, CPU 510 may execute one or more programs located remotely from system 500. For example, system 500 may access one or more remote programs that, when executed, perform functions consistent with embodiments of the present invention.

I/O device 530 may comprise one or more input/output devices that allow data to be received and/or transmitted by system 500. For example, I/O device 530 may include one or more input devices, such as a keyboard, touch screen, mouse, and the like, that enable search criteria and data to be input from a user. Further, in addition to display 560, I/O device 530 may include one or more additional output devices, such as a monitor, printer, speaker devices, and the like, that enable data to be output, displayed, or presented to a user. The configuration and number of input and/or output devices incorporated in I/O device 530 are not critical to implementing embodiments of the invention.

As indicated above, an external database (such as a database external to and accessible by system 500) may store the objects or items that are to be searched by system 500. By way of example, such a database may be an Oracle™ database, a Sybase™ database, or other relational database that is accessible to system 500 via a network (e.g., a local area network (LAN), a wide area network (WAN), an intranet, or the Internet). In one embodiment, to prevent repetitive requests to the external database, after objects or items stored in the external database are searched by system 500, the hierarchy of objects or items and search results may be stored in memory 520 of system 500. Systems and methods of the present invention, however, are not limited to separate databases or even to the use of a database. For example, the items or objects to be searched may be stored in memory 520 of system 500.

Figure 2:
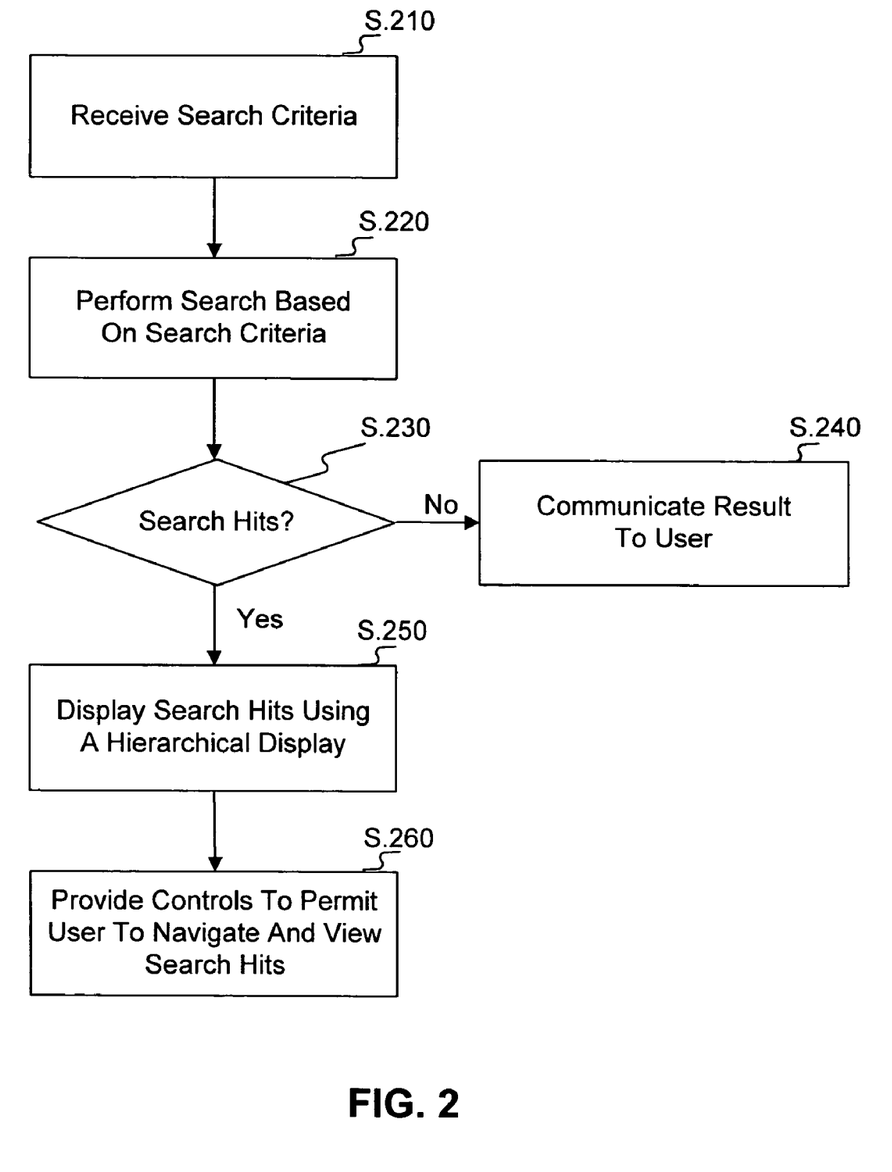
FIG. 2 is a flowchart of an exemplary process for searching and displaying search hits in hierarchies, consistent with an embodiment of the invention.
Figure 3:
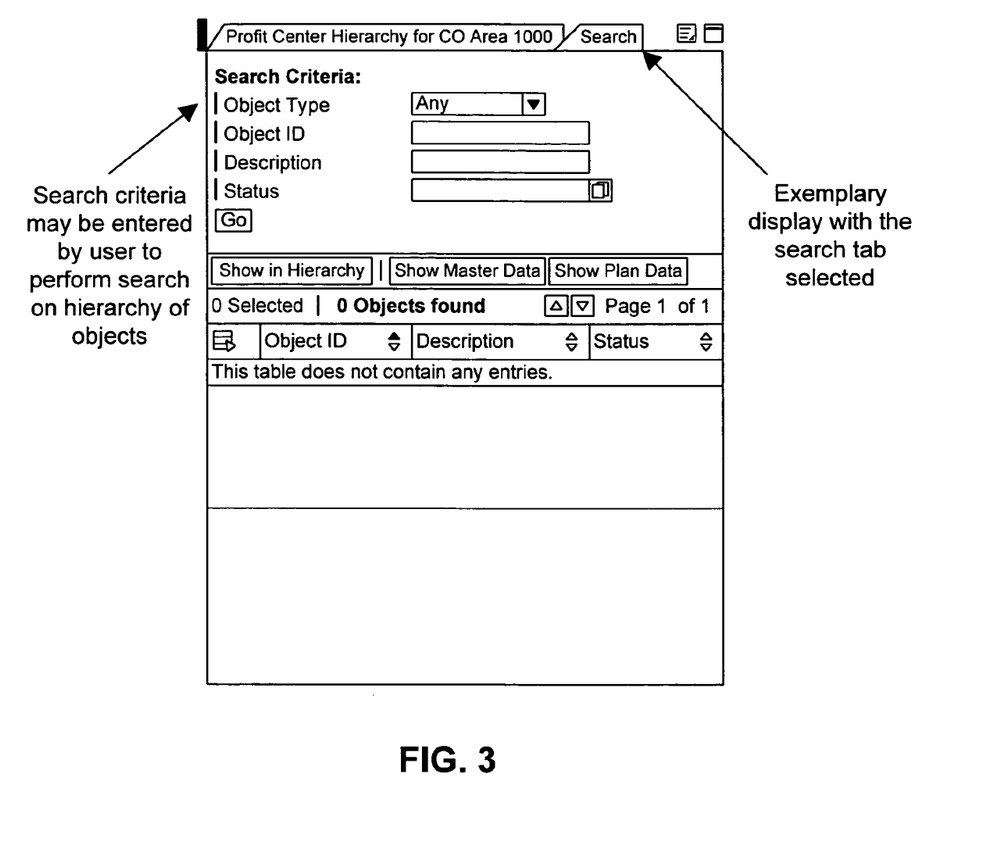
FIG. 3 illustrates an exemplary embodiment of a display for entering search criteria for a search to be performed on a hierarchy, consistent with the invention.

FIG. 2, by way of example, illustrates an exemplary method for searching and displaying search hits in a hierarchy. The method may comprise receiving search criteria (step S.210). In one embodiment, the search criteria may be provided from a user and, in such a case, step S.210 may include providing a search form or input screen to permit a user to enter the search criteria. FIG. 3 illustrates an exemplary display of a search form or input screen to permit a user enter search criteria to perform a search on the hierarchy. In the example of FIG. 3, the search tab ("Search") is selected for this purpose. To enter the search criteria, the display may include an input screen area or search form to be completed by the user. By way of example, various search criteria may be provided, such as Object Type, Object ID, Description and Status, as illustrated in FIG. 3. In one embodiment, the range of possible search criteria may be predetermined, determined automatically, and/or based on the items or objects to be searched. These are merely examples and, as will be appreciated by those skilled in the art, other approaches for entering or receiving search criteria may be provided.

After the search criteria is provided, a user can initiate the search by selecting an action button. In the case of the example of FIG. 3, a "Go" button is provided to execute the search. If the user is uncertain of the search criteria, he/she may toggle back to a hierarchy view of the data by selecting a hierarchy tab (such as the "Profit Center Hierarchy for CO Area 100" tab in FIG. 3).

Figure 4:
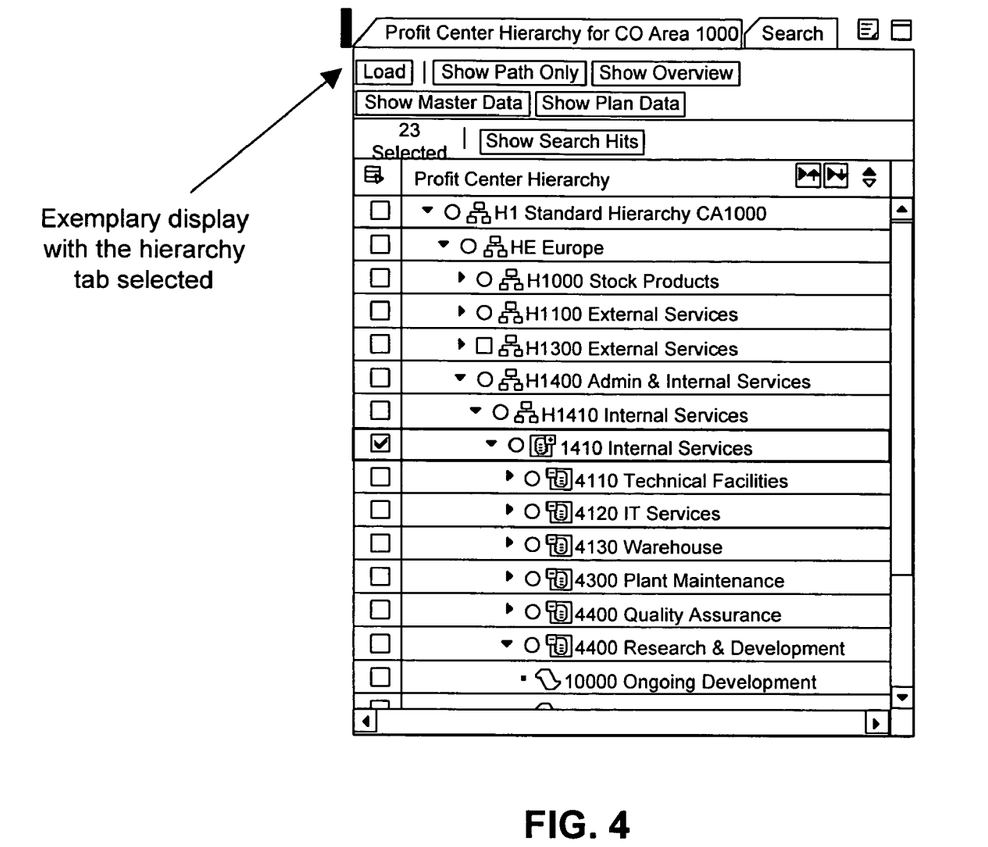
FIG. 4 illustrates an exemplary embodiment of a display of objects arranged in a hierarchy, consistent with the invention.

Consistent with an embodiment of the invention, FIG. 4 illustrates an exemplary display of objects organized in a hierarchy. The exemplary display of FIG. 4 may be generated in a computing-based environment and presented to a user on a display screen (e.g., a CRT, LCD or flat panel display). The exemplary display may be generated by first obtaining the hierarchy of objects by reading the stored data (e.g., in memory 520 of system 500) or by requesting the hierarchy or objects or items from an external source, such as an external database. In one embodiment, the hierarchy of objects can be obtained by an identification of the hierarchy itself (i.e., a list of known hierarchies with identification data for each hierarchy can be maintained). In an alternative embodiment, the hierarchy of objects can be created on demand out of a pool of data objects, whose data fields enable an inference of the hierarchical relationships between the data objects. The pool of data objects may be identifiable through some identification data. By way of example, a user may select which pool of data objects should be used by selecting a "Load" button (see, e.g., FIG. 4) which may bring up a selection screen containing all alternatives known to the system or which provide the user with the possibility of determining in any way what the data source should be. After obtaining the hierarchy of objects, the objects can be displayed in any manner consistent with the hierarchy of objects and their relationships, as illustrated for example in FIG. 4.

The hierarchy of objects may be displayed within a window or other display area. Control icons (such as arrows ("▼", "►"), plus/minus symbols ("+", "−")) and/or other control buttons may be included to permit a user to expand or collapse portions of the hierarchy as needed. As indicated above and shown in the example of FIG. 4, the display can be toggled between a hierarchy view and a search view. To switch between the different views, a user may select the appropriate tabs (e.g., hierarchy and search tabs) provided at the top of the window. For the exemplary display of FIG. 4, the hierarchy tab ("Profit Center Hierarchy for CO Area 1000") is selected to present a hierarchy view of the objects to the user.

Returning to FIG. 2, after receiving the search criteria, a search for objects in accordance with the search criteria is performed (step S.220). For example, using the search criteria input by the user, any conventional method for searching may be used. As will be appreciated, the exact method of searching is not critical to implementing embodiments of the invention. In one embodiment, a search request may be sent to an external source, such as the external database each time a search is requested. In a preferred embodiment, to improve the speed at which searching can occur, the objects and search results may be stored in memory 520 of system 500. Alternatively, in another embodiment, a search may be performed locally on a hierarchy of objects or on items stored in memory 520 of system 500 and the results stored in memory 520.

After the search is performed, a determination may be made as to whether any search hits were found (step S.230). This determination can be made using any conventional method for searching and keeping track of any search hits. For example, in one embodiment, the objects may contain a status indicator, such as a flag, that is set by the search process when an object meets the search criteria set by the user. In this embodiment, after the searching is complete, the hierarchy of objects can be navigated to determine which objects are search hits by checking the status indicator of each object. In an alternative embodiment, the search hits can be stored in an index table containing identification data and possibly data on which part of the hierarchy in hierarchy of objects the search hit resides. In this embodiment, after searching is complete and the index table containing the search hits has been created, the index table can be checked to determine whether any search hits exist and which part of the hierarchy of the hierarchy of objects the search hit should be displayed in (see, e.g., step S.240).

If no search hits are found (step S.230; No), then that result may be communicated to the user (step S.240). This step may involve displaying an appropriate message (e.g., "0 Objects Found" or "No Search Hits") to the user. In addition, the user may be given the option to perform another search by modifying the search criteria, etc.

Figure 5:
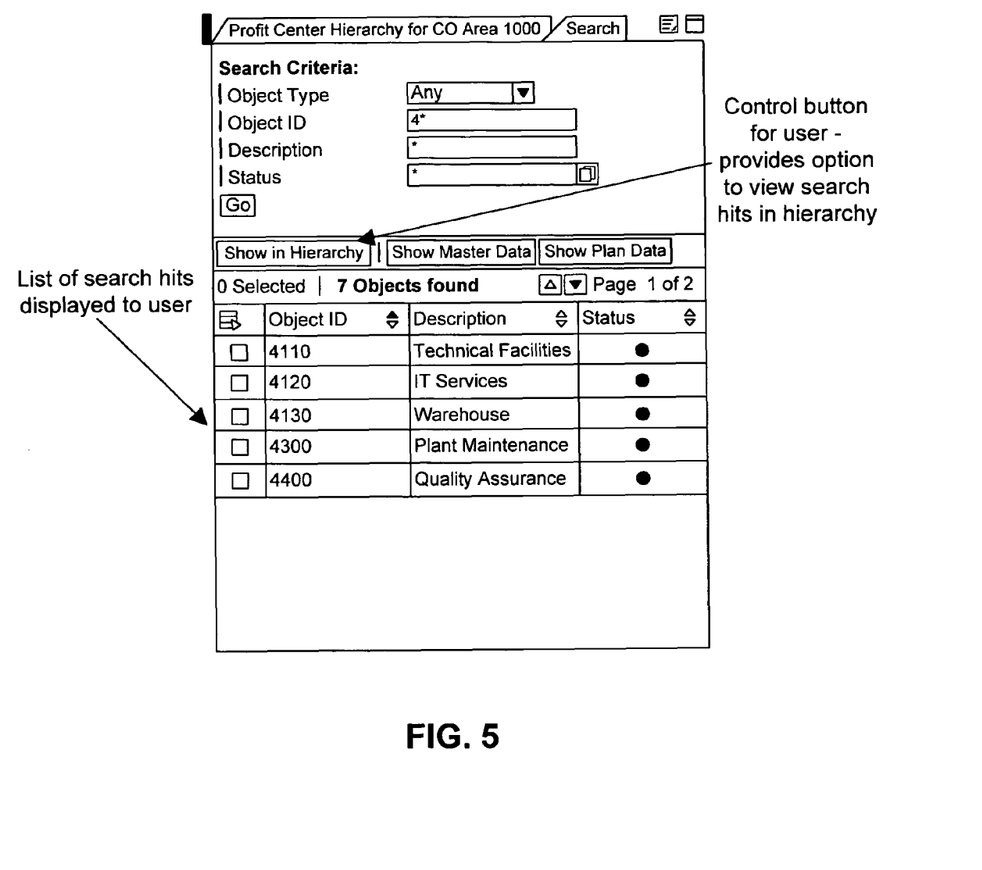
FIG. 5 illustrates an exemplary embodiment of a display for presenting search hits from a search on a hierarchy, consistent with the invention.

If one or more search hits exist (step S.230; Yes), then the search hits may be displayed to the user using a hierarchical display (step S.250). Consistent with the invention, this step may include displaying the search hits within a hierarchical display of objects (see, for example, FIG. 6). Additionally, or alternatively, a search view may be displayed to the user that includes an area for displaying the search hits. In one embodiment, as shown in FIG. 5, a display area below a search criteria input area may provide a flat or plain list of all search hits. Further, information related to each hit (e.g., Object ID, Description, Status, etc.) as well as general search result information (e.g., "7 objects found") may be provided. The user may be permitted to toggle between this plain or general view and a hierarchy data view (such as that illustrated FIG. 6) by selecting appropriate control buttons (such as a "Show in Hierarchy" button).

To view and navigate the search hits within the display of the hierarchy, additional control buttons may be provided for the user (step S.260). An exemplary hierarchy view with such control buttons is shown in FIG. 6 and further described below.

Figure 6:
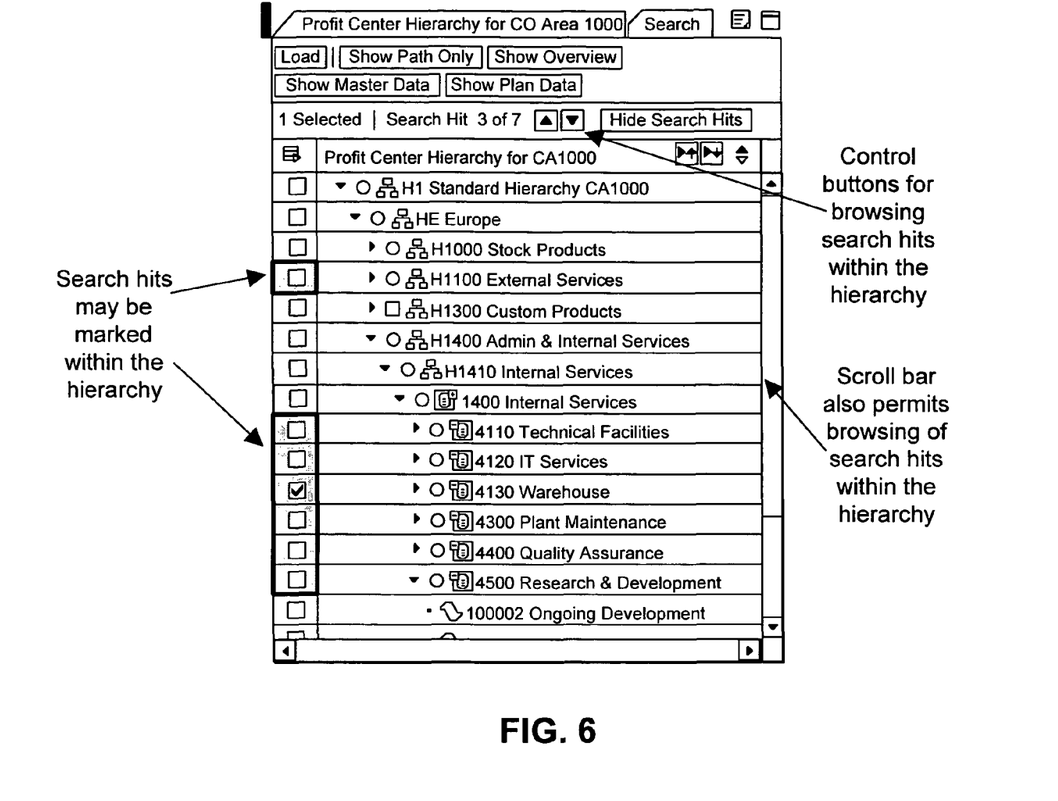
FIG. 6 illustrates an exemplary embodiment of a display for presenting search hits in a hierarchy, consistent with the invention.

Consistent with an embodiment of the invention, FIG. 6 illustrates an example of a display of a hierarchy view with the search hits identified for the user. As shown in FIG. 6, search hits may be identified in the display of the hierarchy of the objects. Consistent with the invention, each search hit may be marked, coded or otherwise highlighted for easy identification. In one embodiment, objects in the hierarchy that correspond to a search hit may be color coded or shaded. In the case of color coding or shading, different colors or shading may be used to indicate whether the search hit corresponds to a node or is within the node (e.g., the search hit corresponds to a node below a displayed parent or root node). By way of example, in the exemplary display of FIG. 6, the object entitled "H1100 External Services" may be coded with a specific color (such as light blue) or shading (light shading) to indicate that the node includes one or more search hits. In such a case, the user may expand and navigate the node using the appropriate control buttons (such as arrows ("▼", "▶")). Such control buttons may enable the user to view the nodes that specifically correspond to the search hits. With respect to other nodes, such as the object entitled "4110 Technical Facilities," such nodes may be coded with a different color (such as dark blue) or different shading (such as darker shading) to indicate that they correspond to a search hit. Of course, other marking schemes are possible to distinguish between nodes containing a search hit versus nodes that correspond to a search hit. For example, nodes that contain a search hit may only be shaded, whereas a node corresponding to a search hit may be shaded and marked with an appropriate character or icon (such as a star or check mark).

As illustrated in FIG. 6, other special control buttons may be provided in the hierarchy view to permit a user to navigate and browse the search hits (step S.260). Some or all of these control buttons may only be presented when the display of a hierarchy view includes search hits (compare FIG. 4 with FIG. 6). To facilitate navigation of the search hits, up/down scroll buttons ("▲", "▼") may be provided. Such scroll buttons may permit a user to skip back and forth between the various search hits. Synchronization with the scroll bar for the main display may be coordinated with this movement. In addition, highlighting or outlining of the selected objects may be performed to aid the user in identifying his/her place during browsing.

Other control buttons in the hierarchy view with the search hits may also be provided. For example, a user may be permitted to enter the number of a specific search hit (e.g., 3 of 7) and, as a result, be guided directly to that hit. In addition, the user may be given the option to hide the search hits in the hierarchy view by selecting an appropriate control or action button ("Hide Search Hits"). This may put the hierarchy view back into its original display (see FIG. 4), from where the user could navigate back to a hierarchy view with the search hits identified by selecting another control or action button ("Show Search Hits"). Alternatively, or additionally, the user may be permitted to toggle back to the flat list of the search hits by selecting an appropriate action button or tab (e.g., the "Search" tab). Within the search view, the user could then perform additional searches, as needed.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

Other embodiments of the invention will be apparent to those skilled in the art from consideration of the specification and practice of the invention disclosed herein. It is intended, therefore, that the specification and examples be considered as exemplary only, with a true scope and spirit of the invention being indicated by the following claims.

What is claimed is:

1. A method for searching and displaying search hits as a hierarchy of objects in a computer-based environment, the method comprising:

providing a display including the hierarchy of objects;
performing a search on the hierarchy of objects based on search criteria entered by a user;
identifying search hits based on the search performed on the hierarchy of objects, each of the search hits corresponding to an object matching the search criteria;
indicating the search hits identified from the search to the user in the display including the hierarchy of objects;
providing a set of control buttons to permit the user to navigate the display and view the search hits,
providing information, including a class ID, description, and status, for each of the search hits;
providing a first indicator to indicate that a root node includes at least one of the search hits;
providing a second indicator to indicate when the root node or a node below the root node contains a search hit located within the root node or the node below the root node; and
providing a third indicator to indicate when the node below the root node corresponds to the search hit located within the node below the root node, wherein the first indicator, the second indicator, and the third indicator are different and distinguish to the user when the search hit is contained in the node below the root node and when the search hit in the node below the root node corresponds to the search hit.

2. The method of claim 1, wherein the criteria entered by the user is entered through at least one of a search form and an input screen.

3. The method of claim 1, wherein the hierarchy of objects and the search hits are displayed in separate areas of the display.

4. The method of claim 1, wherein the search hits are displayed within the hierarchy of objects.

5. The method of claim 4, wherein the first indicator is a marking or a coding and the second indicator and third indicator are either a marking, a coding, or a highlighting.

6. The method of claim 1, wherein there is more than one node that can be expanded using the set of control buttons to display other objects that are included within the more than one node.

7. The method of claim 1, further comprising displaying the search hits in a flat list.

8. A system for searching and displaying search hits as a hierarchy of objects in a computer-based environment, the system comprising:

a memory including a program that
provides a display including the hierarchy of objects;
performs a search on the hierarchy of objects based on search criteria;
identifies search hits based on the search performed on the hierarchy of objects, each of the search hits corresponding to an object matching the search criteria;
indicates the search hits identified from the search to a user in the display including the hierarchy of objects;
provides a set of control buttons to permit the user to navigate the display and view the search hits;
provides information, including a class ID, description, and status, for each of the search hits;
providing a first indicator to indicate that a root node includes at least one of the search hits;
providing a second indicator to indicate when the root node or a node below the root node contains a search hit located within the root node or the node below the root node; and
providing a third indicator to indicate when the node below the root node corresponds to the search hit located within the node below the root node, wherein the first indicator, the second indicator, and the third indicator are different and distinguish to the user when the search hit is contained in the node below the root node and when the search hit in the node below the root node corresponds to the search hit; and
a processor that executes the program.

9. The system of claim 8, wherein the criteria entered by the user is entered through at least one of a search form and an input screen.

10. The system of claim 8, wherein the hierarchy of objects and the search hits are displayed in separate areas of the display.

11. The system of claim 8, wherein the search hits are displayed within the hierarchy of objects.

12. The system of claim 11, wherein the first indicator is a marking or a coding and the second indicator and third indicator are either a marking, a coding, or a highlighting.

13. The system of claim 11, wherein there is more than one node that can be expanded using the set of control buttons to display other objects that are included within the more than one node.

14. The system of claim 8, wherein the hierarchy of objects includes nodes that can be expanded using the set of control buttons to display the search hits that are included within the nodes.

15. A computer program product, tangibly embodied in a computer-readable storage medium, including instructions for execution by a processor for performing a method for searching and displaying search hits as a hierarchy of objects, the method comprising:

providing a display including the hierarchy of objects;
performing a search on the hierarchy of objects based on search criteria entered by a user;
identifying search hits based on the search performed on the hierarchy of objects, each of the search hits corresponding to an object matching the search criteria;
indicating the search hits identified from the search to the user in the display including the hierarchy of objects;
providing a set of control buttons to permit the user to navigate the display and view the search hits,
providing information, including a class ID, description, and status, for each of the search hits;
providing a first indicator to indicate that a root node includes at least one of the search hits;
providing a second indicator to indicate when the root node or a node below the root node contains a search hit located within the root node or the node below the root node; and
providing a third indicator to indicate when the node below the root node corresponds to the search hit located within the node below the root node, wherein the first indicator, the second indicator, and the third indicator are different and distinguish to the user when the search hit is contained in the node below the root node and when the search hit in the node below the root node corresponds to the search hit.

16. The computer program product of claim 15, wherein the criteria entered by the user is entered through at least one of a search form and an input screen.

17. The computer program product of claim 15, wherein the hierarchy of objects and the search hits are displayed in separate areas of the display.

18. The computer program product of claim 15, wherein the search hits are displayed within the hierarchy of objects.

19. The computer program product of claim 18, wherein the first indicator is a marking or a coding and the second indicator and third indicator are either a marking, a coding, or a highlighting.

20. The computer program product of claim 15, wherein there is more than one node that can be expanded using the set of control buttons to display other objects that are included within the more than one node.

21. The computer program product of claim 15, wherein the method further comprises displaying the search hits in a flat list.

22. A method for searching and displaying search hits as a hierarchy of objects in a computer-based environment, the method comprising:
   providing a display including the hierarchy of objects;
   performing a search on the hierarchy of objects based on search criteria entered by a user;
   identifying search hits based on the search performed on the hierarchy of objects, each of the search hits corresponding to an object matching the search criteria;
   indicating the search hits identified from the search to the user in the display including the hierarchy of objects; and
   providing a set of control buttons to permit the user to navigate the display and view the search hits,
   wherein a marking or a coding identifies a root node as containing or corresponding to the search hit and a first color or shading is used to indicate when a root node contains at least one of the search hits, and a second color or shading, that is different from the first color or shading, is used to indicate when a node below the root node corresponds to a search hit.

23. A method for searching and displaying search hits as a hierarchy of objects in a computer-based environment, the method comprising:
   providing a display including the hierarchy of objects;
   performing a search on the hierarchy of objects based on search criteria entered by a user;
   identifying search hits based on the search performed on the hierarchy of objects, each of the search hits corresponding to an object matching the search criteria;
   indicating the search hits identified from the search to the user in the display including the hierarchy of objects;
   providing a set of control buttons to permit the user to navigate the display and view the search hits;
   providing a first indicator to indicate that a root node includes at least one of the search hits; and
   providing a second indicator to indicate when the root node or a node below the root node contains a search hit located within the node below the root node and
   providing a third indicator to indicate when the node below the root node corresponds to the search hit located within the node below the root node,
   wherein the first indicator, the second indicator, and the third indicator are different and distinguish to the user when the search hit is contained in the node below the root node and when the search hit in the node below the root node corresponds to the search hit,
   wherein each of the search hits is associated with a number and the search hits are located when the corresponding number is received from the user.

* * * * *